United States Patent
Iida

[19]

[11] Patent Number: 5,827,619
[45] Date of Patent: Oct. 27, 1998

[54] BATTERY HOLDER

[75] Inventor: Fumio Iida, Kanagawa-ken, Japan

[73] Assignee: Leader Electronics Corp., Kanagawa, Japan

[21] Appl. No.: 801,787

[22] Filed: Feb. 18, 1997

[30] Foreign Application Priority Data

Feb. 19, 1996  [JP]  Japan .................................. 8-030746

[51] Int. Cl.⁶ ...................................................... H01M 2/10
[52] U.S. Cl. ................................................ 429/1; 429/100
[58] Field of Search ................................. 429/1, 96, 100

[56] References Cited

U.S. PATENT DOCUMENTS

| | | | |
|---|---|---|---|
| 4,414,298 | 11/1983 | Krenz | 429/1 X |
| 5,116,699 | 5/1992 | Miyajima | 429/100 |
| 5,194,340 | 3/1993 | Kosako | 429/1 |
| 5,229,220 | 7/1993 | Stanton et al. | 429/1 |

Primary Examiner—Stephen Kalafut
Attorney, Agent, or Firm—Fish & Richardson P.C.

[57] ABSTRACT

A battery holder incorporated in an electrical device is provided which includes a housing for holding a battery which supplies a voltage to electrical circuits of the device. The battery holder contains positive and negative side contacts fixed to the housing for connecting positive and negative electrodes of the battery to supply a voltage to electrical loads. The positive side contact includes a back plate fixed to the housing, a conductive contact plate for contacting the positive electrode of the battery, the contact plate forming a U-shaped or V-shaped spring together with the back plate, and at least two protective plates of an insulation material arranged along the outer periphery of the contact plate and protruding from it. The distance between the protective plate is defined to be larger than the diameter of the positive electrode of the battery and smaller than the diameter of the battery itself. The negative side contact is formed with a coil to have a resilient force in the longitudinal direction of the housing.

4 Claims, 2 Drawing Sheets

BATTERY HOLDER

BACKGROUND OF THE INVENTION

The present invention relates generally to a battery holder for holding a battery within an electronic device or the like, and more particularly to a battery holder which is adapted to prevent instantaneous breaks of electric power due to external shock applied thereto as well as to avoid the forming of an electric connection between a battery and a load circuit when the battery is mounted in the opposite direction.

A conventional battery holder comprises a housing for accommodating a battery (or a plurality of batteries connected in serial and/or parallel), and a negative (−) side contact and a positive (+) side contact arranged in the housing. The negative and positive side contacts are arranged so that they can be brought into contact with a negative (−) and positive (+) electrodes of a battery to extract from these contacts a battery voltage which is then supplied to a load circuit. In addition, the negative side contact of the holder is provided with a resilient force by means of a coil or the like so that an accommodated battery can be urged toward the positive side contact in order to facilitate the mounting of the battery in the battery holder and ensure that the electrodes of the battery come into contact with the contacts.

While the prior art battery holder has the negative side contact provided with the resilient force by means of the coil or the like as mentioned above, the positive side contact is not provided with such a resilient force. Accordingly, any shock applied to the holder housing from the outside causes a battery accommodated within to move toward the negative side contact against the resilient force of the negative side contact, and consequently, the positive side contact of the holder is detached from the positive terminal of the battery.

In addition, in a prior art battery holder, if the battery is accommodated in the battery holder to be connected to the contacts in a opposite polarity, a voltage of the opposite polarity is supplied to a load circuit. In this event, some load circuits may suffer from a fault due to the reversely applied voltage. To prevent such an inconvenience, a rectifying element such as a diode can be inserted in one of power supply lines from the positive and negative side contacts to prevent the opposite polarity voltage from flowing into a load circuit. However, a mount space or other factors may not readily allow a diode to be mounted in some battery holders. Further, even if such a diode is inserted, a reverse voltage may break the inserted diode, leaving the diode in an on state in which a current is capable of flowing from a cathode of the diode to an anode. The on state of the diode would cause a fault in a load circuit, as is the case of a power supply line not provided with a diode. Furthermore, an inserted reverse current preventing diode causes the supply voltage to drop, whereby the operating speed of the load circuit may be reduced.

As described above, the prior art battery holder has the following serious problems: (1) the instantaneous breaks of power supply from an accommodated battery due to external shocks; and (2) the supply of a reverse voltage to a load circuit due to a reverse connection between the battery and contacts of the holder. While there are battery holders which have both positive and negative side contacts provided with resilient forces to solve the problem of (1), these battery holders cannot prevent the reverse connection of batteries. On the other hand, while there are battery holders which are additionally provided with a reverse connection preventive mechanism on a negative side contact to solve the problem of (2), these battery holders cannot prevent instantaneous breaks of electric power due to external shocks.

Accordingly, there is no battery holder which can prevent both of the above-mentioned problems (1) and (2), and a need exists for providing a single battery holder which can avoid them both.

SUMMARY OF THE INVENTION

The invention provides a simple and inexpensive battery holder which is capable of preventing instantaneous breaks of electric power due to external shocks as well as reliably preventing a reverse voltage from being supplied to a load circuit, even if a battery or batteries are inadvertently mounted in the battery holder so that they are connected in reverse polarity, without requiring a diode for preventing the application of the reverse voltage.

The battery holder includes a housing for holding a battery.

A positive side contact is present in the battery holder for contacting a positive terminal of the battery. The positive side contact includes:

a back plate fixed to the housing, a conductive contact plate for contacting the positive terminal of the battery, the contact plate forming a U-shaped or V-shaped spring together with the back plate, and at least two protective plates of an insulation material arranged along the outer periphery of the contact plate and protruding from it, the distance between the protective plates being defined to be larger than the diameter of the positive terminals of the battery and smaller than the diameter of the battery itself, thus preventing a negative terminal of the battery from connection with the contact plate.

The battery holder also contains a negative side contact having a resilient force in the longitudinal direction of the housing, for contacting the negative terminal of the battery.

Finally, to provide the battery voltage to outer electrical circuits, a pair of lines connected to the positive and negative side contacts is present.

In a preferred embodiment, the protective plates is constituted to have a pair of rod-like structures extending along a direction in which a battery is mounted into the housing from the outside.

DESCRIPTION OF THE PREFERRED EMBODIMENTS

The present invention will hereinafter be described in connection with preferred embodiments thereof with reference to the accompanying drawings.

Figure 1A:
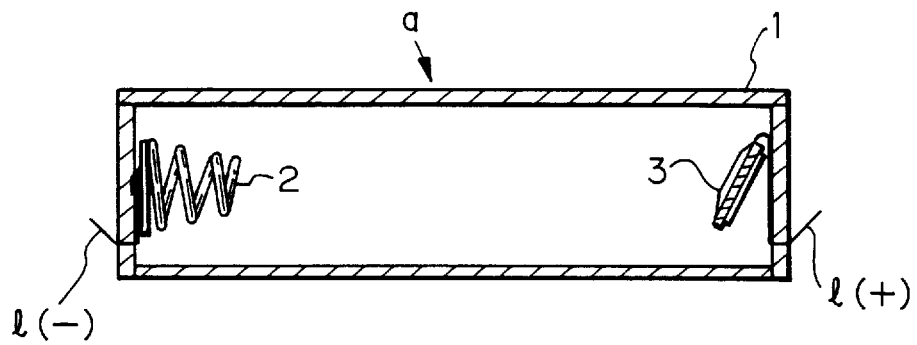
FIG. 1(A) is a longitude-sectional view of a battery holder according to an embodiment of the present invention.

Referring first to FIG. 1(A) illustrating a longitude-sectional view of a battery holder according to one embodiment of the present invention, the battery holder comprises a housing 1, a negative (−) side contact 2, and a positive (+) side contact 3. The housing 1 has an internal space, for example, for accommodating two serial batteries. The (−) side contact 2 is formed in a coil shape, to have a resilient force for strongly urging mounted batteries toward the (+) side contact 3. An arrow "a" in FIG. 1(A) indicates the direction in which batteries are mounted in the housing 1 from the outside. A pair of power supply lines 1 and 1 are respectively connected to the negative side contact 2 and the positive side contact 3 to supply a battery voltage to a load circuit (not shown).

Figure 1B:
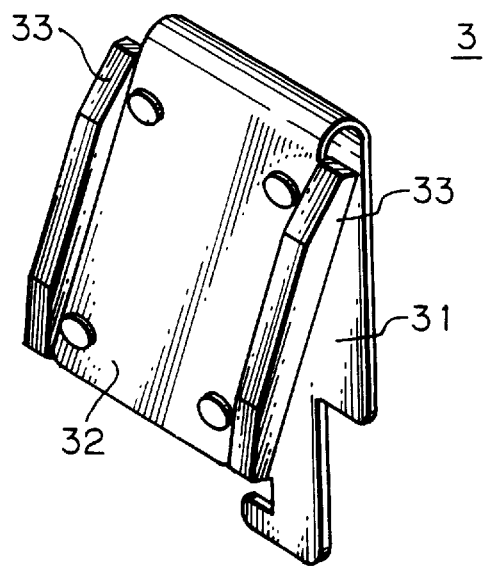
FIG. 1(B) is a perspective view of a positive (+) side contact of the battery holder shown in FIG. 1(A)

FIG. 1(B) illustrates in detail the structure of the positive side contact 3 which comprises a back plate 31 fixed to the housing 1, a conductive contact plate 32 integral with the back plate 31, and a pair of protective plates 33 of an insulation material arranged on both sides of the contact plate 32. The line positive is connected to the back plate 31.

The back plate 31 and the contact plate 32, as illustrated in FIG. 1(B), are joined together to form a U-shaped or V-shaped spring, and the back plate 31 is fixed to the housing 1 such that the joint portion is directed to a battery insertion opening (not shown) of the housing 1.

The paired protective plates 33 are arranged on both sides of the contact plate 32 protrusively from the contact plate 32 as rod-like structures extending in the direction "a" in which batteries are mounted in the housing 1. The distance between the paired protective plates 33 is defined to be larger than the diameter of a positive terminal of a mounted battery and to be smaller than that of a negative terminal of the battery or the diameter of the battery itself.

Figure 2:
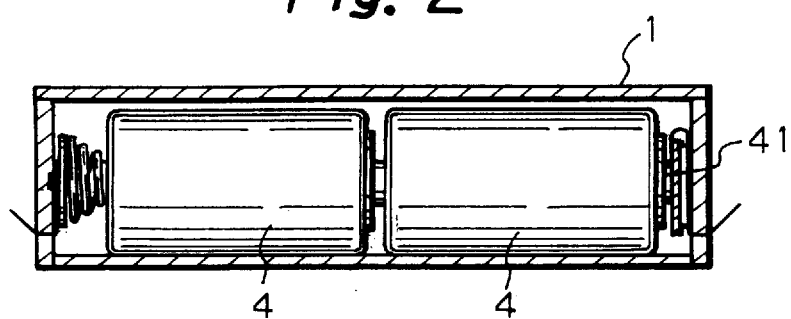
FIG. 2 is a longitude-sectional view of the battery holder shown in FIG. 1 with batteries mounted therein.

The contact plate 32, which has a resilient force sufficient to support the weight of batteries, is maintained in a position spaced apart from the back plate 31 by its resilient force, as illustrated in FIGS. 1(A) and 1(B). When batteries 4 are accommodated in the housing 1 as illustrated in FIG. 2, the contact plate 32 is pressed toward the back plate 31 and urges a positive terminal 41 of one of the batteries 4 with its resilient force so that the contact plate 32 reliably comes into contact with the electrode 41. A voltage from the batteries 4 is supplied to the load circuit through the power supply lines negative and positive.

Figure 3A:
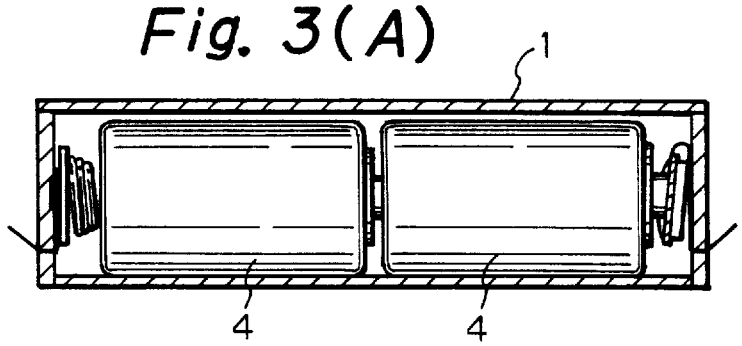
FIG. 3(A) is a longitude-sectional view illustrating a state in which batteries mounted in the battery holder shown in FIG. 1 are moved in the longitude direction of the battery holder.
Figure 3B:
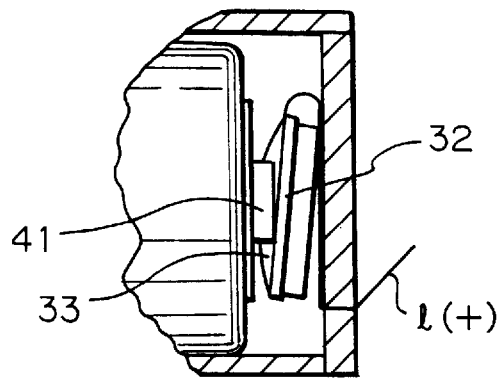
FIG. 3(B) is an enlarged view illustrating in detail a portion of the battery holder with the battery in the state shown in FIG. 3(A)

When an external shock is applied to the battery holder with the batteries 4 mounted to cause the batteries 4 to move toward the negative side contact 2, as illustrated in FIGS. 3(A) and 3(B), the contact plate 32 can follow the movement of the batteries 4 with its resilient force, while urging the positive terminal 41 of the battery 4 to maintain the contact with the contact plate, thereby making it possible to prevent any instantaneous break of electric power to the load circuit.

Also, since the distance between the paired protective plates 33 is defined to be larger than the diameter of the positive terminal 41 of the battery 4 as mentioned above, the positive terminal of the battery 4 can come into contact with the contact plate 32 at the portion between the paired protective plates 33, as illustrated in FIG. 3, when the batteries 4 are mounted between the negative side contact 2 and the positive side contact 3 of the battery holder in a correct positional relationship.

Figure 4A:
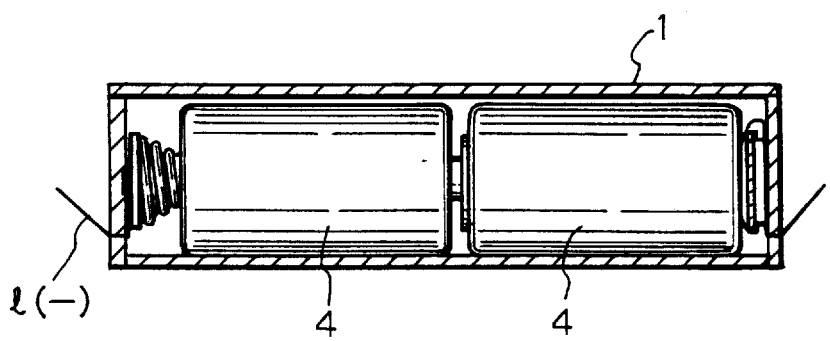
FIG. 4(A) is a longitude-sectional view illustrating a state in which batteries are mounted in the opposite direction to be connected to the contact of opposite polarity.
Figure 4B:
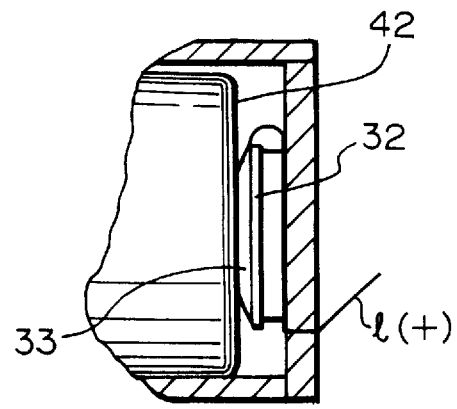
FIG. 4(B) is an enlarged view illustrating in detail a portion of the battery holder in the state shown in FIG. 4(A).

On the contrary, since the distance between the plates 33 is smaller than the diameter of the battery itself as mentioned above, if the batteries 4 are mounted in the opposite direction to be connected to the contact of opposite polarity as shown in FIG. 4(A), a flat surface of the negative electrode of the battery 4 abuts to the insulating protective plates 33 to prevent the negative terminal from coming into contact with the contact plate 32 as shown in FIG. 4(B). In this way, the batteries 4 remain disconnected with the power supply line positive, so that a reverse voltage will not be applied to the load circuit.

The protective plates 33 may take any arbitrary shape and structure not limited to the structure illustrated in FIG. 1 as long as it ensures that the positive terminal 41 of the battery 4 comes into contact with the contact plate 32 and prevents the negative terminal of the battery 4 from contacting the contact plate 32.

However, the protective plates 33 are preferably formed as a pair of rod-like structures extending along the mounting direction of the batteries 4 in the housing 1 as illustrated in FIG. 1, because the protective plates 33 thus formed can guide the positive terminal of the battery 4 when the battery 4 is mounted in the housing 1 from the outside and prevent the battery 4 from laterally displacing after the mounting.

The battery holder structured as described above according to the present invention can prevent any instantaneous break of electric power due to external shocks applied as well as protecting a load circuit from being supplied with a reverse voltage, even if batteries are mounted in the housing in the opposite direction so that they are connected in reversed polarity, thus making it possible to protect the load circuit from malfunction, damage, and so on.

While there has been described what is considered to be preferred embodiment of the present invention, it will be understood to those skilled in the field that various changes and modifications may be made without departing from the spirit of the present invention.

What is claimed is:

1. A battery holder comprising:
  (a) a housing for holding at least a battery therein;
  (b) a positive side contact for contacting a positive terminal of the battery, the positive side contact including:
    a back plate fixed to the housing;
    a conductive contact plate for contacting the positive terminal of the battery, the contact plate forming a U-shaped or V-shaped spring together with the back plate; and
    at least two separate protective plates of an insulation material arranged along an outer periphery of the contact plate and protruding therefrom, each protective plate being secured to a side of the contact plate, and the distance between the protective plates being defined to be larger than a diameter of the positive terminal of the battery and smaller than a diameter of the battery itself, thereby preventing a negative terminal of the battery from connection with the contact plate;
  (c) a negative side contact providing a resilient force in a longitudinal direction of the housing, for contacting the negative terminal of the battery; and
  (d) a pair of lines connected to the positive and negative side contacts to provide a battery voltage to outer electrical circuits.

2. A battery holder according to claim 1, wherein the protective plates comprise rod-like structures extending along a direction in which a battery is mounted into the housing.

3. A battery holder according to claim 1, wherein the negative side contact comprises a coil spring.

4. A battery holder according to claim 2, wherein the negative side contact comprises a coil spring.

* * * * *